(12) United States Patent
Notheis et al.

(10) Patent No.: US 11,126,872 B2
(45) Date of Patent: Sep. 21, 2021

(54) COMMUNICATION FLOW FROM ROAD USER TO A VEHICLE DRIVING AN AUTOMATED MANNER

(71) Applicant: ZF Friedrichshafen AG, Friedrichshafen (DE)

(72) Inventors: Philipp Notheis, Salem-Mimmenhausen (DE); Leschek Debernitz, Eriskirch (DE); Daniel Schmidt, Markdorf (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 208 days.

(21) Appl. No.: 16/489,625

(22) PCT Filed: Aug. 30, 2018

(86) PCT No.: PCT/EP2018/073318
§ 371 (c)(1),
(2) Date: Aug. 28, 2019

(87) PCT Pub. No.: WO2019/063237
PCT Pub. Date: Apr. 4, 2019

(65) Prior Publication Data
US 2020/0005056 A1    Jan. 2, 2020

(30) Foreign Application Priority Data

Sep. 28, 2017    (DE) .................... 10 2017 217 256.8

(51) Int. Cl.
*G06K 9/00*    (2006.01)
*E01F 9/20*    (2016.01)
(Continued)

(52) U.S. Cl.
CPC ........... *G06K 9/00818* (2013.01); *B60Q 1/50* (2013.01); *E01F 9/20* (2016.02); *G06K 9/00228* (2013.01);
(Continued)

(58) Field of Classification Search
CPC .......... G06K 9/00818; G06K 9/00228; G06K 9/00335; G06K 9/00805; G06K 9/00362;
(Continued)

(56) References Cited

U.S. PATENT DOCUMENTS 5,594,416 A    1/1997  Gerhaher
6,421,600 B1 *  7/2002  Ross ...................... B60L 50/51
                                                701/117
(Continued)

FOREIGN PATENT DOCUMENTS

CN        205396082 U  *  7/2016
DE        8205948        3/1984
(Continued)

OTHER PUBLICATIONS

International Search Report from European Patent Office ISA in PCT/EP2018/073318 dated Dec. 6, 2018 (2 pgs. in English, 3 pgs. in German).

(Continued)

*Primary Examiner* — Mahendra R Patel
(74) *Attorney, Agent, or Firm* — Crowell & Moring LLP (57) ABSTRACT

Disclosed is a training evaluation device for a vehicle having a first input interface for receiving a recording of a sign given by a road user, and a second input interface for receiving a driver control command corresponding to the sign, wherein the training evaluation device propagates an artificial neural network with the recording of the sign and the driver control command to obtain a vehicle control command in the propagation of the artificial neural network, and adjusts weighting factors such that the vehicle control command matches the driver control command, for the machine learning of a meaning of the sign. A method for training an artificial neural network, a working evaluation device for an automatically operated vehicle, a driver assis- (Continued)

tance system, and a method for recognizing a meaning of a sign and for indicating a vehicle reaction to a known meaning of this sign are also disclosed.

14 Claims, 4 Drawing Sheets

(51) Int. Cl.
  *B60Q 1/50* (2006.01)
  *G06N 3/02* (2006.01)
  *G08G 1/16* (2006.01)
(52) U.S. Cl.
  CPC ..... *G06K 9/00335* (2013.01); *G06K 9/00805* (2013.01); *G06N 3/02* (2013.01); *G08G 1/163* (2013.01)
(58) Field of Classification Search
  CPC ........... G06K 9/6267; E01F 9/20; B60Q 1/50; B60Q 1/2696; B60Q 1/28; B60Q 1/30; G06N 3/02; G08G 1/163; G02B 2027/014; G02B 27/017
  USPC ........................................................ 382/104
  See application file for complete search history.

(56) References Cited

U.S. PATENT DOCUMENTS

| | | | |
|---|---|---|---|
| 8,954,252 B1 | 2/2015 | Urmson et al. | |
| 9,014,905 B1 | 4/2015 | Kretzschmar et al. | |
| 9,645,576 B2* | 5/2017 | Frangou | B60W 30/16 |
| 10,112,528 B1* | 10/2018 | Mazuir | B60Q 1/268 |
| 10,180,572 B2* | 1/2019 | Osterhout | G06F 3/011 |
| 10,539,787 B2* | 1/2020 | Haddick | G02B 27/0093 |
| 2005/0232469 A1* | 10/2005 | Schofield | B60Q 1/08 382/104 |
| 2006/0184323 A1* | 8/2006 | Park | G01C 21/36 701/431 |
| 2012/0126996 A1* | 5/2012 | McCarthy | G08G 1/166 340/902 |
| 2013/0214915 A1* | 8/2013 | Nikol | B60Q 1/32 340/425.5 |
| 2014/0214260 A1* | 7/2014 | Eckert | B60Q 1/48 701/28 |
| 2014/0297115 A1* | 10/2014 | Kang | B60W 50/082 701/37 |
| 2015/0109148 A1* | 4/2015 | Cheatham, III | G01S 7/4804 340/944 |
| 2016/0167672 A1* | 6/2016 | Krueger | A61B 5/4863 340/576 |
| 2017/0028912 A1* | 2/2017 | Yang | B60Q 9/00 |
| 2017/0124407 A1 | 5/2017 | Micks et al. | |
| 2017/0190336 A1 | 7/2017 | Vijayan et al. | |
| 2017/0240096 A1 | 8/2017 | Ross et al. | |
| 2017/0245127 A1* | 8/2017 | Pedersen | H04L 12/1845 |
| 2018/0037157 A1* | 2/2018 | Hundt | B60J 10/265 |
| 2018/0215383 A1* | 8/2018 | Badger | B60W 30/18118 |

FOREIGN PATENT DOCUMENTS

| | | |
|---|---|---|
| DE | 4305186 A1 | 9/1994 |
| DE | 10200002 | 8/2002 |
| DE | 102016120507 | 12/2016 |
| DE | 102017217256.8 | 3/2019 |
| WO | WO 2019/063237 A1 | 4/2019 |

OTHER PUBLICATIONS

Search report issued in corresponding German Application DE 10 201 217 256.8 (10 pages).

* cited by examiner

COMMUNICATION FLOW FROM ROAD USER TO A VEHICLE DRIVING AN AUTOMATED MANNER

RELATED APPLICATIONS

This application is a filing under 35 U.S.C. § 371 of International Patent Application PCT/EP2018/073318, filed Aug. 30, 2018, claiming priority to German Patent Application 10 2017 217 256.8, filed Sep. 28, 2017. All applications listed in this paragraph are hereby incorporated by reference in their entireties.

TECHNICAL FIELD

The present disclosure relates to a training evaluation device for a vehicle, a method for training an artificial neural network, and a computer program product for executing the method, a working evaluation device for an automatically operated vehicle, a driver assistance system, a method for determining the meaning of a sign given by a road user for indicating a vehicle reaction to a known meaning of this sign, and a computer program product for executing the method.

BACKGROUND

In these times of digitalization and networking, increasingly more vehicles are driven automatically. Automatically driven vehicles drive toward their target destination until arriving at it. There may be various obstacles along the way that the automatically driven vehicle will have to deal with. These obstacles can be other road users, for example. The road users, e.g., pedestrians and/or bicyclists, currently communicate with drivers of vehicles through eye contact, gestures, or by assessing a clear manner of driving. Moreover, there are traffic regulations that regulate traffic.

If in the future increasingly more, or only automated vehicles are driven in traffic, it will become increasingly difficult for pedestrians and/or bicyclists or other road users to assess the manner of driving and the programmed decisions of the automated vehicles. A mixture of traffic, i.e., traffic comprising automated vehicles and non-automated vehicles, and the interaction between automated vehicles and non-automated vehicles, in particular non-motorized road users, is a substantial challenge. In order to avoid endangering the positive effects of automation, it is important that automated vehicles are able to discern the behavior of other, non-automated road users, and to react thereto.

SUMMARY

This is the basis for the present disclosure. One object of the present disclosure is to create a communication flow from a road user to an automated vehicle, such that the road user remains in eye contact with the vehicle, in order to analyze, and asses its behavior, and to thus be able to calmly and safely observe further movement thereof in traffic.

This object is achieved by a training evaluation device for a vehicle that has features disclosed herein, a method for training an artificial neural network that has features disclosed herein, and a computer program product that has features disclosed herein for executing the method, a working evaluation device for an automatically operated vehicle that has features disclosed herein, a driver assistance system that has features disclosed herein, a use of a driver assistance system that has features disclosed herein, a method for recognizing a meaning of a sign given by a road user and for signalizing a vehicle reaction to a known meaning of this sign that has features disclosed herein, and a computer program product that has features disclosed herein for executing the method.

Further developments and advantageous embodiments of the present disclosure are disclosed herein.

The training evaluation device according to the present disclosure for a vehicle has a first input interface for recording a sign given by a road user, and a second input interface for obtaining a driver control command corresponding to the sign, wherein the training evaluation device is configured to propagate an artificial neural network with the recording of the sign and the driver control command, in order to obtain a vehicle control command in the propagation of the artificial neural network, and to adjust weighting factors such that the vehicle control command matches the driver control command, in order to teach a meaning of the sign through machine learning.

An evaluation device is a device that processes input information and outputs a result. In particular, an electronic circuit, e.g., a central processing unit or a graphics processing unit, is an evaluation device. A training evaluation device is an evaluation device that is used in a training phase or learning phase for the machine learning of a behavior. After the training phase, the behavior is learned, and the evaluation device can be used as a working evaluation device, in order to respond appropriately to new information.

A vehicle is a vehicle for travel on land, in water, or in the air, in particular a street vehicle.

An interface is a device between at least two functional units, at which an exchange of logical values, e.g., data, or physical values, e.g., electrical signals, takes place, either unidirectionally or bidirectionally. The exchange can be analog or digital. The exchange can also be hard wired or wireless.

A sign is in particular a sign with which a road user indicates a traffic decision to another road users, e.g., signaling right-of-way to another driver.

Road users are pedestrians, motorized scooters and non-motorized bicyclists and/or other non-motorized road users.

A driver control command is a command from a driver with which the driver controls the vehicle he is driving. By way of example, depressing a gas pedal or a brake pedal are driver control commands. Driver control commands can be electronically processed.

An artificial neural network is an algorithm executed on an electronic circuit and programmed using the neural network of the human brain as a model. Functional units of an artificial neural network are artificial neurons, the output of which in general forms a value, evaluated via a weighted sum of the input, plus a systematic error, the so-called bias. By testing numerous inputs with various weighting factors and/or activation functions, artificial neural networks are trained in a manner similar to that with a human brain. The training of an artificial neural network using predetermined inputs is referred to as machine learning. Propagation, in particular forward propagation, refers to a summation and output through the activation function. A subgroup of machine learning is so-called deep learning, in which a series of hierarchical layers of neurons, so-called hidden layers, is used for carrying out the process of machine learning. An artificial neural network with numerous hidden layers is a deep neural network. Artificial intelligence refers to the appropriate reaction to new information. Weighting factors are adjusted, e.g., through backward propagation, i.e., an obtained output is processed as an input by the artificial neural network, in order to obtain the original input in the form of a computed output.

A driver control command is a command computed by the artificial neural network for controlling the vehicle, e.g., an electric voltage with which a brake actuator is actuated.

The treatment of other road users can be trained by the training evaluation device according to the present disclosure with the artificial intelligence of a vehicle, in particular with regard to what the features of a signal that is given can be. If, for example, a driver of a vehicle approaching a crosswalk detects a clear indication by a pedestrian standing on the crosswalk that the pedestrian is waiting at the crosswalk, and the vehicle can continue driving, the driver will continue to press the gas pedal, and continue driving, instead of stopping at the crosswalk in accordance with the traffic regulations. The fact that it is a clear signal means that there is no conversation between the vehicle and other road users obstructing traffic. The indication is detected by the training evaluation device through the first input interface, and the corresponding pressing of the gas pedal is detected through the second input interface. The training evaluation device calculates a vehicle control command based on these input values by means of the artificial neural network, and optimizes it by adjusting the weighting factors. If the training evaluation device then detects a similar situation, the training evaluation device then calculates and outputs a corresponding vehicle control command on its own. Based on the driver control command, the training evaluation device learns to react appropriately to the indication to continue given by the pedestrian.

The training evaluation device is also configured to simulate an incorrect movement of the vehicle, e.g., a stopping vehicle control command when an indication to continue by the road user has been detected. In this manner, incorrect movements can be accumulated without additional sensors. An artificial neural network can learn to react to errors with simulated incorrect movements.

The first input interface is preferably configured to record a visible sign, preferably a gesture, in particular a hand movement, and/or a facial expression, and/or an acoustic sign from the road user. Hand movements, facial expressions, and/or acoustic expressions are the typical signs with which road users, in particular non-motorized road users, communicate with drivers of vehicles.

In a further development, the first input interface is configured to obtain a recording of a size and/or a facial expression of the road user, wherein the artificial neural network is configured to obtain an age of the road user based on the size and/or the facial expression, in order to adjust the vehicle control command based on the age. This adjustment is necessary for effectively detecting vulnerable road users, e.g., children or elderly people.

According to an embodiment, the first input interface is an interface to an environment detection sensor and/or a system of environment detection sensors, preferably an image sensor of a camera, a radar, a lidar, and/or a sound sensor, and/or the second input interface is an interface to a vehicle data transfer system, preferably a CAN bus. The decisions of a road user that are shared using signs can be particularly easily detected and processed by means of environment detection sensors. A sound sensor can provide speech recognition, wherein corresponding filters are preferably provided in order to filter ambient sounds from the speech of a road user. The CAN bus is the controller area network bus, which connects control devices in a vehicle, and transfers signals. A driver control command can be readily evaluated therewith.

The artificial neural network is advantageously a multi-layer, preferably convolutional or recurrent artificial neural network. Convolutional neural networks are distinguished by a two- or three-dimensional arrangement of neurons and distributed weighting factors, and are used in particular for image recognition, in which the input is a gray-scale image or an image in a three-dimensional color space, thus forming a two- or three-dimensional matrix. A recurrent, also referred to as a feedback, neural network is a network distinguished by connections of neurons in a layer to neurons in the same layer or a preceding layer. A distinction is made between direct feedback, i.e., the output of a neuron is also used as an input, indirect feedback, in which an output of a neuron is connected to a neuron in the preceding layer, and lateral feedback, in which the output of a neuron is connected to another neuron in the same layer. Practical applications for artificial recurrent neural networks are used in general for solving problems requiring the processing of sequences. Examples of this are character recognition, speech recognition, and machine translation.

The method according to the present disclosure for training an artificial neural network, wherein the artificial neural network is run on a training evaluation device, comprises the following steps:

providing a sign given by a road user received while driving, and a driver control command corresponding to the sign, propagating the artificial neural network with the sign and the driver control command, obtaining a vehicle control command in the propagation of the artificial neural network, and adjusting the weighting factors such that the vehicle control command matches the driver control command, wherein the artificial neural network learns a meaning of the sign. A vehicle control command is learned with the method according to the present disclosure based on the driver control command, in order to react appropriately to signs from road users.

A training evaluation device according to the present disclosure is preferably used for executing the method.

The computer program product according to the present disclosure is configured to be uploaded to a memory in a computer, and contains software code segments with which the steps of the method according to the present disclosure for training an artificial neural network are carried out when the computer program runs on the computer.

A computer is a device for processing data that can process data by means of the programmable calculation rules.

Computer program products normally comprise a series of commands which cause the hardware to execute a specific method when the program is uploaded, delivering a specific result. When the relevant program is used on a computer, the computer program product brings about a technological effect, specifically the obtaining of a vehicle control command.

A memory is a medium for storing data.

Software is a collective term for programs and associated data. The complement to software is hardware. Hardware refers to the mechanical and electrical elements in a data processing system.

An artificial neural network is particularly easily trained with the computer program product according to the present disclosure to react to signs given by road users with a corresponding vehicle control command.

The working evaluation device according to the present disclosure for an automatically operated vehicle has an input interface for receiving a recording of a sign from a road user, wherein the working evaluation device is configured to feed an artificial neural network that has been trained the meaning of the sign with the recording of the sign, preferably according to the method of the present disclosure for training an artificial neural network, and to obtain a vehicle control command corresponding to the sign. The working evaluation device also comprises a first output interface for outputting the vehicle control command for the road user, in order to acknowledge the meaning of the sign, and to indicate to the road user a vehicle reaction to the known meaning of this sign.

An automatically operated vehicle is a vehicle that has technical equipment for assuming driving duties of the respective vehicle, including longitudinal and transverse guidance, after activating a corresponding automated driving function, in particular a highly or fully automated driving function according to the standard SAE J3016, such that a vehicle can be controlled with a vehicle control device. In particular, this technical equipment is configured to respond to the traffic regulations regarding vehicle guidance during the automated vehicle control, i.e., during the automated operation of the vehicle. The technical equipment can be composed in particular of sensors, control units, and actuators. Moreover, this technical equipment can also preferably be manually overridden or deactivated at any time by the vehicle driver. Furthermore, the technical equipment can be configured to detect the necessity of the single-handed vehicle control by the vehicle driver, and to indicate to the vehicle driver the necessity of the single-handed vehicle control with enough time prior to relinquishing the vehicle control to the vehicle driver, optically, acoustically, tactilely, or by other perceivable means, and to indicate a use contradicting the system description. The vehicle driver is also the one who activates an automated driving function, and also uses it for controlling the vehicle when he does not control the vehicle single-handedly in the framework of the intended use of this function. An automatically operated vehicle that does not require human interaction during operation of the vehicle, aside from determining the destination, is a fully automated vehicle. With a fully automated vehicle, the vehicle driver is not required to assume direct control of the vehicle.

The meaning of a sign relates to semantics, and means that which is understood by someone based on the sign. An environment detection sensor first detects only a sign, without its semantic meaning. The meaning of a sign is learned.

The working evaluation device according to the present disclosure recognizes the meaning of a recorded sign by means of an artificial neural network that has been trained accordingly, and can react appropriately with a corresponding vehicle control command. In particular, the working evaluation device according to the present disclosure advantageously indicates to the road user that it has detected the sign given by the road user, and knows what it means.

The working evaluation device is preferably configured to indicate that the vehicle will continue to move, or will stop, in response to a detected indication to stop or continue driving from the road user. A communication flow from a driver of the vehicle to the road user is replaced by this signaling in a simple manner.

In an advantageous embodiment, the working evaluation device has a second output interface for outputting the vehicle control command to a vehicle control device.

A vehicle control device is a device with which the vehicle can be controlled. Vehicle control is longitudinal and/or transverse control.

The vehicle is automatically operated by the vehicle control device.

The driver assistance system according to the present disclosure has an environment detection sensor, or a system of environment detection sensors for detecting a sign given by a road user, a working evaluation device configured to propagate an artificial neural network trained to know the meaning of the sign with the detection of the sign and to obtain a vehicle control command corresponding to the sign, and a signal transmitter that is configured to recognize a meaning of the sign, and to indicate a vehicle reaction to a known meaning of this sign to a road user.

Driver assistance systems, referred to in English as advanced driver-assistance systems, are additional devices in vehicles for assisting the driver in certain driving situations.

A signal transmitter is a device, module or circuit that generates and preferably transmits a signal, i.e., information with a specific meaning.

The driver assistance system according to the present disclosure can thus automatically react appropriately to signs given by road users and indicate a corresponding reaction to the road user.

The working evaluation device is preferably a working evaluation device according to the present disclosure.

In a further development of the present disclosure, the signal transmitter is configured to generate an electric, optical, and/or acoustic signal, wherein the signal transmitter can preferably be located in a front region and/or rear region of the vehicle, preferably on a bumper, and preferably includes a light strip.

An optical signal can be perceived by road users with normal vision simply through eye contact with the vehicle. An acoustic signal, e.g., a sound or sound sequence with a specific frequency, can be perceived by seeing impaired, in particular blind, road users. An electric signal can also be perceived tactilely.

A light strip is a narrow, in particular elongated, component, comprising light emitting elements. A light strip can be perceived particularly easily.

By placing it in the front and/or rear of a vehicle, preferably a bumper, the signal from the signal transmitter can be perceived particularly easily by a road user in the proximity of the vehicle.

In an embodiment of the present disclosure, the driver assistance system has an interface for outputting a signal from the signal transmitter to a portable device for the road user to increase traffic safety, wherein the portable device is configured to make the road user aware of the signaling of the vehicle control command by means of a vibration, based on the signal from the signal transmitter.

Portable devices, also referred to as wearables, are used in a number of ways in the fitness or wellness field, and are connected to a network in order to be able to exchange data with other devices, e.g., computers or other portable devices or mobile end devices. Portable device are worn on the body.

The vibration can be output in particular via a speaker in the form of acoustically perceivable signals. The portable device can be a smartphone or smartwatch, in particular. With such a portable device, pedestrians and bicyclists in particular, are given an early warning of driver decisions in street traffic. Such a portable device is an example of a car-to-x communication application.

According to the present disclosure, a driver assistance system is used in an automatically operated vehicle.

The method for recognizing the meaning of a signal given by a road user and for signalizing a vehicle reaction to a known meaning of this sign, comprises the following steps:
recording the sign,
propagating an artificial neural network trained to recognize the sign with the recording of the sign,
obtaining a vehicle control command in the propagation of the artificial neural network, and
outputting the vehicle control command for the road user. The meaning of the sign is automatically recognized with the method according to the present disclosure, and a corresponding vehicle reaction is indicated to the road user in a simple manner.

A working evaluation device according to the present disclosure, or a driver assistance system according to the present disclosure is preferably used for executing the method according to the present disclosure.

The computer program product according to the present disclosure is configured to be uploaded to a memory in a computer, and contains software code segments with which the steps of the method according to the present disclosure for recognizing a meaning of a sign given by a road user and for signaling a vehicle reaction to a known meaning of this sign are executed when the computer program product runs on the computer.

BRIEF DESCRIPTION OF THE DRAWINGS

The present disclosure shall be explained in detail based on the following figures.

DETAILED DESCRIPTION

The same reference symbols are used in the figures for identical or functionally similar components. Only the respective relevant reference components are indicated with reference numbers in the figures.

Figure 1:
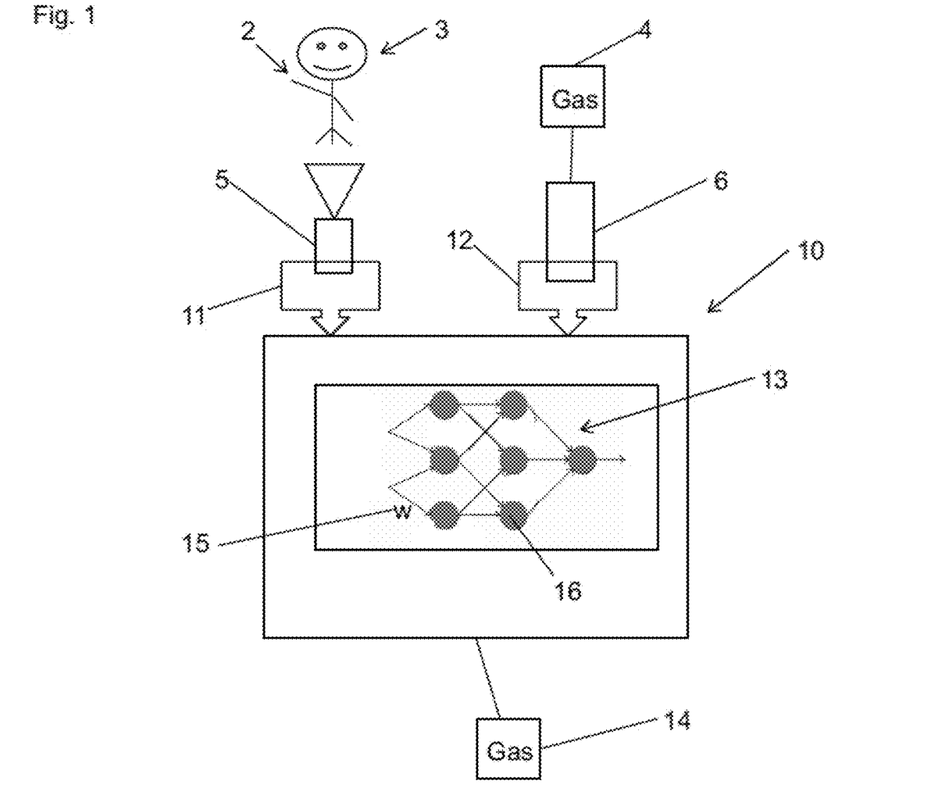
FIG. 1 shows an exemplary embodiment of a training evaluation device according to the present disclosure.

The training evaluation device 10 shown in FIG. 1 receives a sign 2 given by a road user 3 via a first input interface 11. The sign 2 is a clear hand signal indicating that a driver of a vehicle 1 should continue. This sign is recorded by means of an image sensor in a camera, as an example of an environment detection sensor 5. The training evaluation device 10 receives a driver control command 4 via a second input interface 12. The driver control command 4 is to continue to press the gas pedal. The driver of the vehicle actuates a gas pedal to execute the driver control command 4. The necessary pressure to the gas pedal for this can be converted to an electric voltage, which is input to the training evaluation device 10 by means of a vehicle data transfer system 6 via the second input interface 12, and processed therein.

The training evaluation device 10 is a graphic card processor that is configured specifically for automotive applications, which runs an artificial neural network 13. The artificial neural network 13 is a recurrent artificial neural network 13, for example, in which neurons 16 in one layer are connected to neurons 16 in a preceding layer.

The inputs of the artificial neural network 13 are the recording of the sign 2 and a driver control command 4 corresponding to the signs 2. The output of the artificial neural network 13 is a vehicle control command calculated on the basis of the inputs. By adjusting the weighting factors 15, the calculated vehicle control command 14 is optimized, such that the vehicle control command 14 matches the driver control command 4. The training evaluation device 10 learns to assign a corresponding vehicle control command 14 to a recorded sign through actual test drives and/or simulated test drives, and to thus assign a corresponding meaning thereto. If the training evaluation device 10 located on the vehicle 1 records a hand signal from a road user 3 waiting at a crosswalk 9, and a corresponding driver control command 4, pressing the gas pedal if signaled to continue, braking if signaled to stop, the training evaluation device 10 learns to generate a corresponding situation-dependent vehicle control command 14. In a similar situation, the training evaluation device 10 can then react appropriately with a vehicle control command 14, without having recorded a corresponding driver control command 4.

Figure 2:
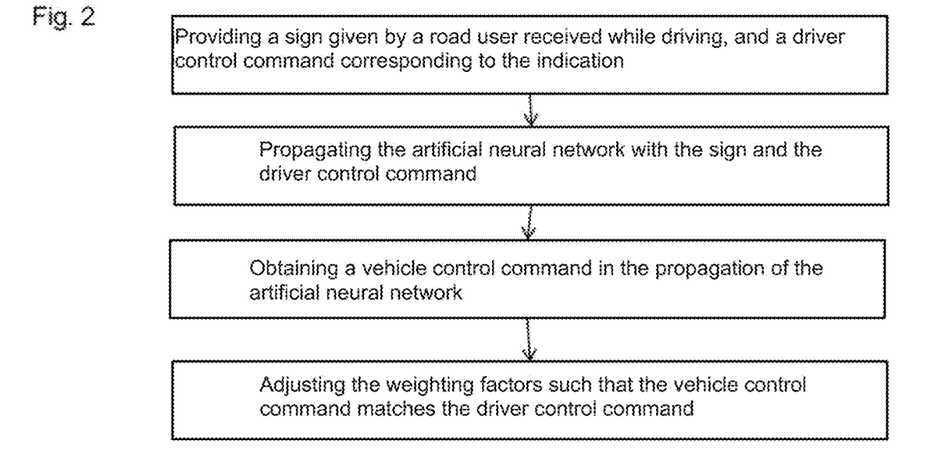
FIG. 2 shows an exemplary embodiment of a method according to the present disclosure for training an artificial neural network.

FIG. 2 shows the method according to the present disclosure for training an artificial neural network 13. The artificial neural network is run on the training evaluation device 10 for the vehicle 1 shown in FIG. 1.

The environment detection sensor 5 provides the training evaluation device 10 with the sign 2 given by the road user 3 recorded while driving the vehicle 1 via the first input interface 11 and the driver control command 4 corresponding to the sign 2 via the second input interface 12. The training evaluation device 10 feeds the sign 2 and the driver control command 4 to the artificial neural network 13. In addition, the training evaluation device 10 simulates an incorrect movement of the vehicle 1, e.g., a stopping vehicle control command for a sign indicating to continue given by the road user. By this means, it is possible to accumulate incorrect movements directly, without additional sensors. The artificial neural network 13 learns to react to errors with simulated incorrect movements. The corresponding vehicle control command 14 is obtained as an output from the artificial neural network 10. The weighting factors 15 are adjusted, e.g., through backward propagation of the artificial neural network 13, such that the vehicle control command 14 matches the driver control command 4. As a result, the artificial neural network 13 learns the semantic meaning of the sign 2.

Figure 3:
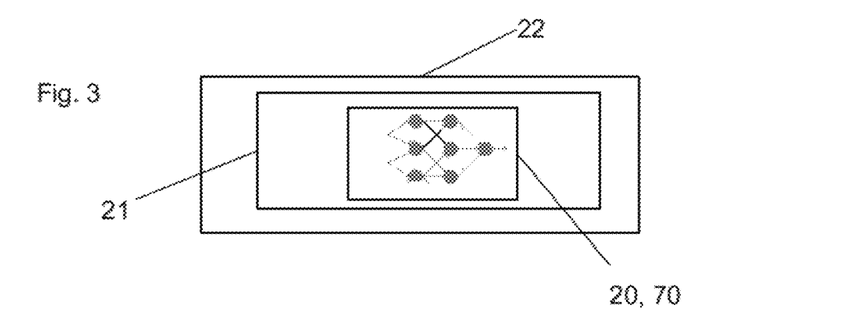
FIG. 3 shows an exemplary embodiment of a computer program product.

A computer program product 20 is shown in FIG. 3. The computer program product 20 is uploaded to a memory 21 in a computer 22, and executes the steps of the method there for training the artificial neural network 13.

Figure 4:
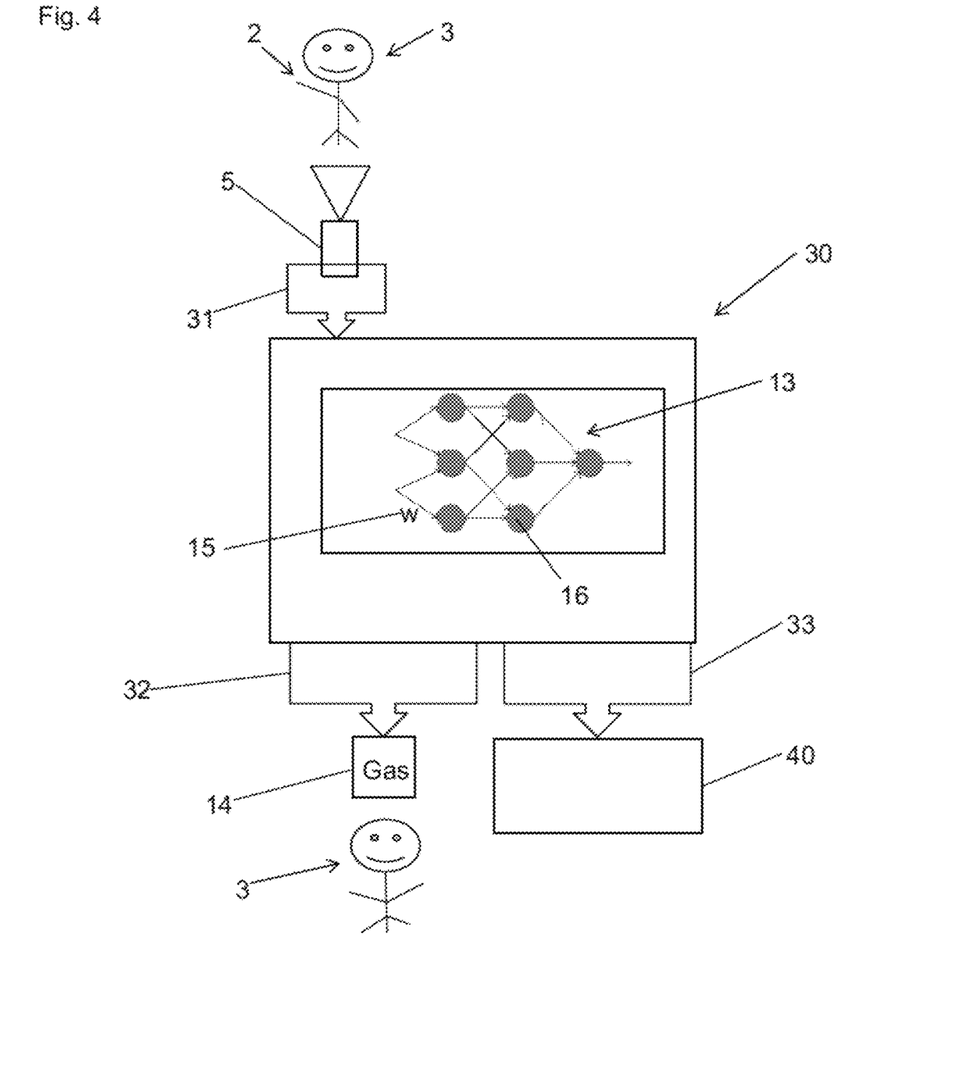
FIG. 4 shows an exemplary embodiment of a working evaluation device according to the present disclosure.

FIG. 4 shows a working evaluation device 30 that runs an artificial neural network 13 trained according to the method described in reference to FIG. 2. The sign 2 given by the road user 3 recorded by the environment detection sensor 5 is provided to the working evaluation device 30 via an input interface 31.

The artificial neural network 13 is optimized by the configuration of its neurons 16 and the adjustment of the weighting factors 15 that takes place in the training phase, in order to calculate the vehicle control command 14 corresponding to the sign 2 that has been recorded. If the working evaluation device 30 records a clear sign 2 to continue, the working evaluation device 30 calculates the corresponding vehicle control command 14 to continue pressing the gas pedal using the artificial neural network 13.

The working evaluation device 30 outputs the vehicle control command to the road user 3 via a first output interface 32, in order to indicate to the road user 3 that the vehicle 1 has acknowledged the sign 2 and will react with a corresponding driving behavior. The vehicle control command 14 is output via a second output interface 33 to a vehicle control device 40, in order to automatically control the vehicle 1 in accordance with the vehicle control command 14.

Figure 9:
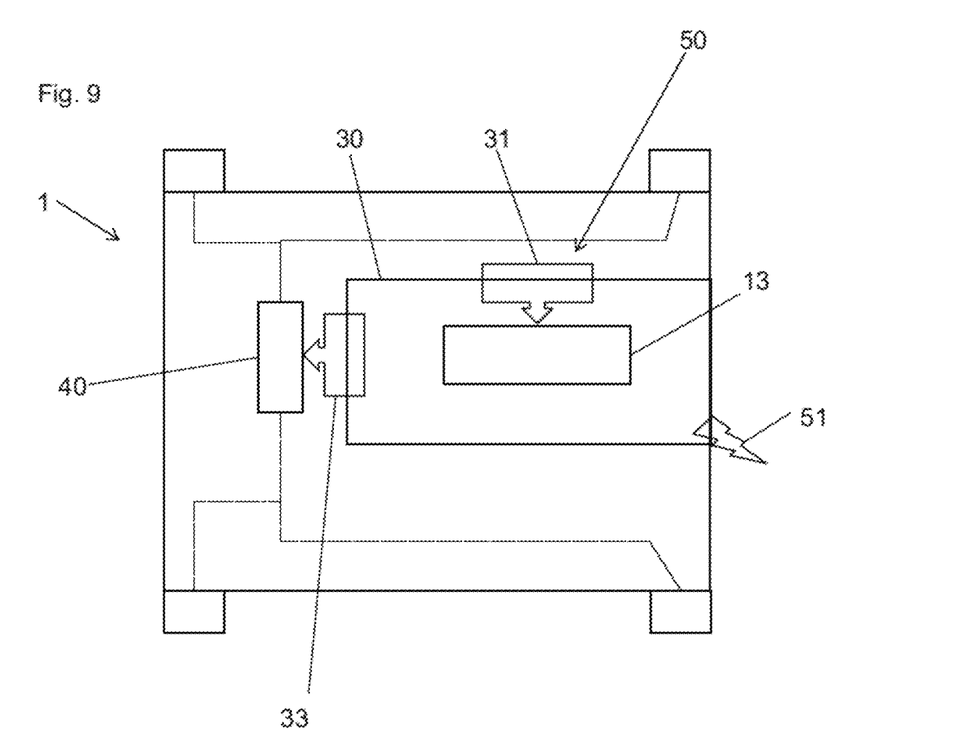
FIG. 9 shows another exemplary embodiment of a driver assistance system according to the present disclosure.

The vehicle control device 40, also shown in FIG. 9, regulates the longitudinal and/or transverse control of the vehicle 1.

Figure 5:
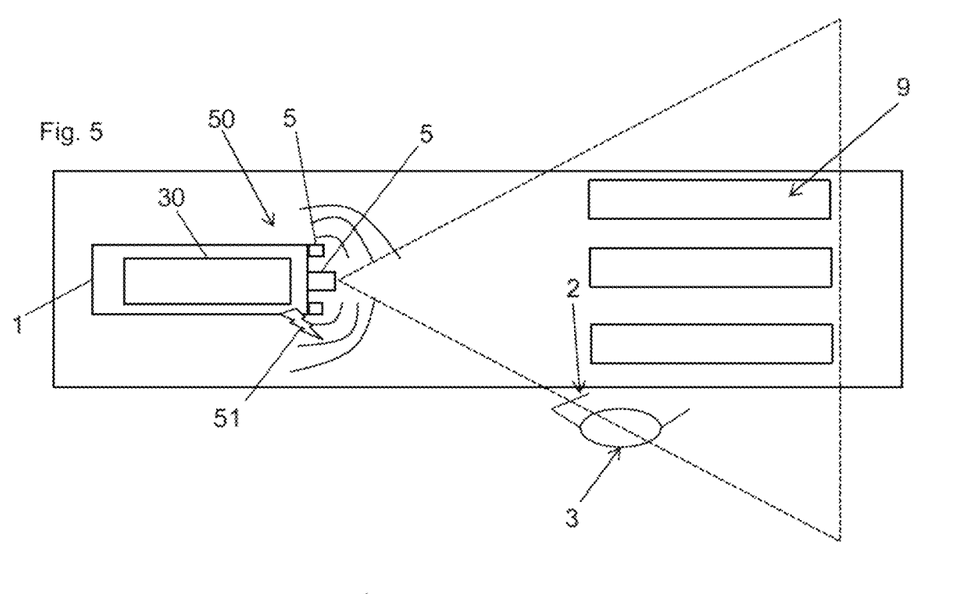
FIG. 5 shows an exemplary embodiment of a driver assistance system according to the present disclosure.

A driver assistance system 50 according to the present disclosure is shown in FIG. 5. The driver assistance system 50 has a system comprised of environment detection sensors that includes a central front camera and two lateral front radars. The driver assistance system 50 is configured in particular to process the various recorded sensor data, i.e., to generate images from the camera data, and to fuse these to obtain a model of the environment, for example.

A pedestrian in the form of a road user 3 is recorded at a crosswalk by the camera and the radar devices. The road user can also be at another type of crossing, e.g., a traffic light. The environment detection sensors 5 also record the sign 2 given by the road user 3 to continue driving the vehicle 1. The working evaluation device 30 of the driver assistance system 50 calculates the vehicle control command 14 corresponding to the sign 2 using the artificial neural network 13.

The driver assistance system 50 also has a signal transmitter 51, with which the vehicle control command 14 is indicated to the road user 3. The signal transmitter 51 thus indicates a vehicle reaction to the known meaning of the sign 2 to the road user 3.

Figure 6:
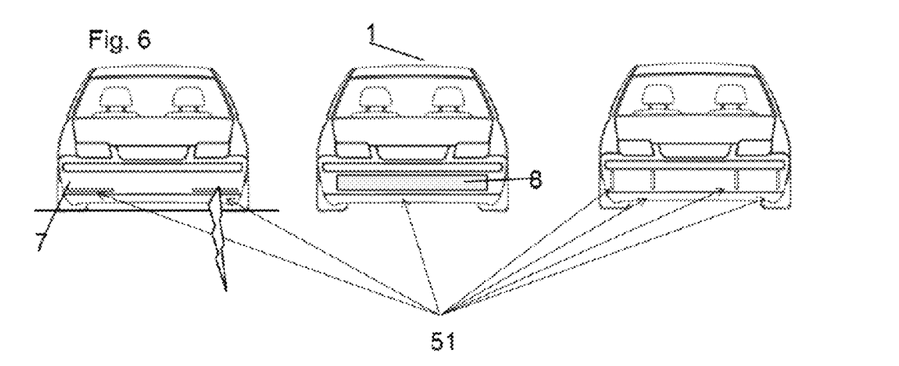
FIG. 6 shows an exemplary embodiment of a signal transmitter of a driver assistance system according to the present disclosure.

The signal transmitter 51 generates and outputs a signal. The signal is a visible signal, e.g., a light signal in a specific color. The signal transmitter 51 can be in the form of a light strip 8 in particular, which contains numerous light sources, as is shown in the middle exemplary embodiment in FIG. 6. By way of example, the light strip 8 can be a strip of light emitting diodes. In the left-hand exemplary embodiment in FIG. 6, the signal transmitter 51 is horizontal, i.e., parallel to a street surface. In the right-hand exemplary embodiment in FIG. 6, the signal transmitter 51 is vertical, i.e., perpendicular to the street surface.

The signal transmitter 51 is configured to indicate a continuation of the vehicle 1 to the road user 3 shown in FIG. 5, i.e., pressing the gas pedal, for example, with a light signal in a first color, preferably green, and a stopping of the vehicle, i.e., braking for example, with a light signal in a second color, preferably red.

Figure 7:
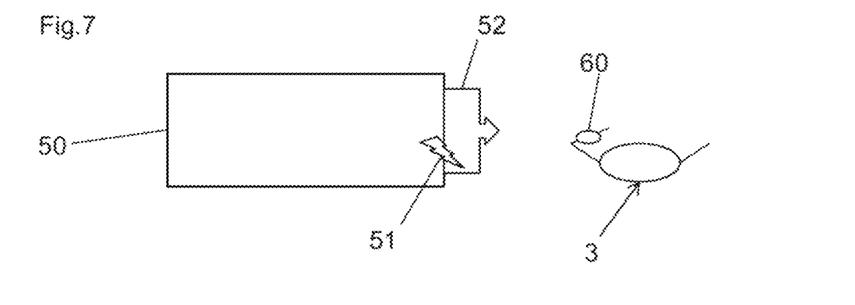
FIG. 7 shows an exemplary embodiment of a driver assistance system according to the present disclosure with an exemplary embodiment of a portable device.
Figure 8:
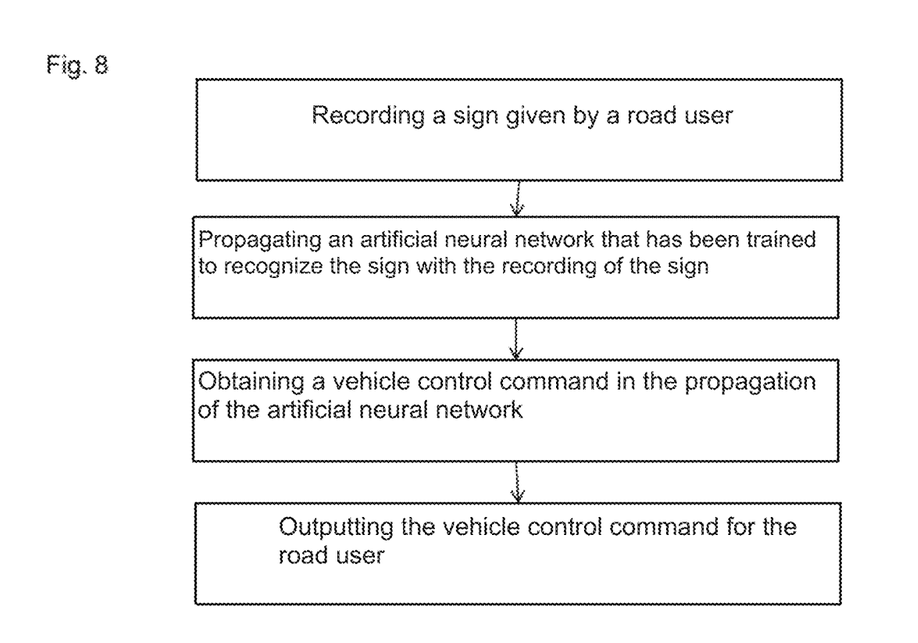
FIG. 8 shows an exemplary embodiment of a method according to the present disclosure for recognizing a meaning of a sign given by a road user and for indicating a vehicle reaction to a known meaning of this sign.

The driver assistance system 50 shown in FIG. 7 has an interface 52. The interface 52 is a WLAN interface with which the signal from the signal transmitter 51 is output to a portable device 60 worn by the road user 3. A complete network comprising the vehicle 1 and the more vulnerable road user 3 is obtained with the interface 52 and the portable device 60. Such a network can be obtained, for example, in a cloud, which preferably executes a corresponding algorithm. As a result, traffic safety is increased. In particular, it is possible to warn of an impending collision. The portable device 60 is also configured to make the road user 3 aware of the indication of the vehicle control command 14 by means of a vibration, based on the signal from the signal transmitter 51.

The method according to the present disclosure for recognizing a meaning of a sign 2 given by a road user 3, and for indicating a vehicle reaction to a known meaning of this sign 2 is shown in FIG. 9. In a first step, the sign 2 given by the road user 3 is recorded, e.g., with an environment detection sensor 5. Subsequently, an artificial neural network 13 trained with the meaning of the sign 2 is fed the recording of the sign 2. A vehicle control command 14 is obtained as the output of the artificial neural network 13. This vehicle control command 14 is output to the road user 3.

A computer program product 70 for executing the method according to the present disclosure for recognizing a meaning of a sign 2 given by a road user 3 and for indicating a vehicle reaction to a known meaning of this sign 2 is shown in FIG. 3.

The driver assistance system 60 can also be successfully used in the following situation. A road user 3, e.g., a pedestrian, is standing at a crosswalk 9, and is waiting for another road user 3. The driver assistance system 50 of the automated vehicle 1 detects the individual road user 3, and indicates that he will stop by means of the signal transmitter 51. The road user 3 indicates to the vehicle 1 that the vehicle 1 should continue through a clear gesture, e.g., a hand movement. This hand movement is recognized as a sign 2 with the corresponding meaning, and processed by the driver assistance system 50. The vehicle 1 then changes the signal, and the signal transmitter 51 indicates that the vehicle 1 will now continue. The vehicle assistance system 50 assesses the gesture based on the size, age, and/or facial expressions of the road user 3. This assessment is necessary to be able to analyze children and elderly people properly.

REFERENCE SYMBOLS 1 vehicle
2 sign
3 road user
4 driver control command
5 environment detection sensor
6 vehicle data transfer system
7 bumper
8 light strip
9 crosswalk
10 training evaluation device
11 first input interface
12 second input interface
13 artificial neural network
14 vehicle control command
15 weighting factor
16 neuron 20 computer program product
21 memory
22 computer
30 working evaluation device
31 input interface
32 first output interface
33 second output interface
40 vehicle control mechanism
50 driver assistance system
51 signal transmitter
52 interface
60 portable device
70 computer program product

The invention claimed is:

1. A training evaluation device for a vehicle comprising:
a first input interface for obtaining a recording of a sign given by a road user; and
a second input interface for obtaining a driver control command corresponding to the sign,
wherein the training evaluation device is configured to feed an artificial neural network with the recording of the sign and the driver control command to obtain a vehicle control command in a propagation of the artificial neural network, and to adjust weighting factors such that the vehicle control command matches the driver control command, for a machine learning of a meaning of the sign;
wherein a vehicle reaction corresponding to the the vehicle control command is indicated to the road user by generating at least one of an electric, optical, or acoustic signal using a signal transmitter,
wherein the signal transmitter comprises a light strip located at least one of a front region or a rear region of the vehicle, and
wherein indicating the vehicle reaction to the road user further comprises outputting the signal from the signal transmitter to a portable device worn by the road user to make the road user aware of the indication of the vehicle reaction based on the signal from the signal transmitter.

2. The training evaluation device according to claim 1, wherein the first input interface is configured to receive a visual sign comprising a gesture, a hand movement, a facial expression, or an acoustic sign from the road user.

3. The training evaluation device according to claim 1, wherein
the first input interface is configured to receive a recording of at least one of a size or a facial expression of the road user, and
wherein the artificial neural network is configured to obtain an age of the road user based on the at least one of the size or the facial expression, in order to adjust the vehicle control command based on the age.

4. The training evaluation device according to claim 1, wherein the first input interface comprises an interface to at least one environment detection sensor comprising at least one of an image sensor of a camera, a radar sensor, a lidar sensor, or a sound sensor, and wherein the second input interface comprises an interface to a vehicle data transfer system.

5. The training evaluation device according to claim 1, wherein the artificial neural network is a multi-layer convolutional or recurrent, artificial neural network.

6. A working evaluation device for an automatically operated vehicle, comprising:
an input interface configured to receive a recording of a sign given by a road user,
wherein the working evaluation device is configured to propagate an artificial neural network that has been trained with a meaning of the sign with the recording of the sign to recognize the meaning of the sign, and to obtain a vehicle control command corresponding to the sign; and
a first output interface for outputting the vehicle control command to the road user to indicate to the road user a vehicle reaction to a known meaning of the sign, wherein indicating the vehicle reaction to the road user comprises generating at least one of an electric, optical, or acoustic signal using a signal transmitter,
wherein the signal transmitter comprises a light strip located at least one of a front region or a rear region of the vehicle, and
wherein indicating the vehicle reaction to the road user further comprises outputting the signal from the signal transmitter to a portable device worn by the road user to make the road user aware of the indication of the vehicle reaction based on the signal from the signal transmitter.

7. The working evaluation device according to claim 6, wherein the working evaluation device is configured to indicate that the vehicle will continue or stop, based on a recorded stopping sign or a recorded continuation sign given by the road user.

8. The working evaluation device according to claim 6 wherein the working evaluation device has a second output interface configured to output the vehicle control command to a vehicle control device.

9. A driver assistance system comprising:
the working evaluation device according to claim 6;
at least one environment detection sensor for recording the sign given by the road user; and
the signal transmitter configured to indicate the vehicle reaction to a known meaning of the sign to the road user.

10. The driver assistance system according to claim 9, further comprising an interface for outputting the signal from the signal transmitter to the portable device worn by the road user.

11. A method for recognizing a meaning of a sign given by a road user comprising:
recording the sign with at least one environmental sensor of a vehicle;
propagating an artificial neural network executed on a processor that has been trained with the meaning of the sign with the recording of the sign;
obtaining a vehicle control command in the propagation of the artificial neural network;
outputting an indication of a vehicle reaction according to the vehicle control command to the road user by generating at least one of an electric, optical, or acoustic signal using a signal transmitter,
wherein the signal transmitter comprises a light strip located at least one of a front region or a rear region of the vehicle, and
wherein outputting the indication comprises outputting the signal from the signal transmitter to a portable device worn by the road user to make the road user aware of the indication of the vehicle reaction based on the signal from the signal transmitter.

12. The method according to claim 11, wherein a non-transitory computer readable medium has stored thereon a computer program that, when executed by a computer, cause the computer to execute the method according to claim 11.

13. The method according to claim 11, further comprising outputting the indication of the vehicle reaction comprising an indication that the vehicle will continue or stop.

14. The method according to claim 11, further comprising outputting the vehicle control command to a vehicle control device to responsively control at least one of a longitudinal or a transverse aspect of the vehicle according to the vehicle control command.

\* \* \* \* \*